United States Patent [19]

Bettini

[11] Patent Number: 4,672,486

[45] Date of Patent: Jun. 9, 1987

[54] APPARATUS FOR ROTATING A MAGNETIC DISC

[75] Inventor: Giuseppe Bettini, Ivrea, Italy

[73] Assignee: Ing. C. Olivetti & C., S.p.A., Ivrea, Italy

[21] Appl. No.: 802,331

[22] Filed: Nov. 26, 1985

[30] Foreign Application Priority Data

Nov. 30, 1984 [IT] Italy ............................... 68189 A/84

[51] Int. Cl.⁴ ............................................. G11B 17/02
[52] U.S. Cl. ....................................... 360/97; 360/99; 369/270
[58] Field of Search ................................ 360/97–99; 369/270

[56] References Cited

U.S. PATENT DOCUMENTS 4,517,617  5/1985  Tsuji et al. ........................... 360/133
4,613,921  9/1986  Holmes ................................. 360/97

*Primary Examiner*—Robert S. Tupper
*Attorney, Agent, or Firm*—Banner, Birch, McKie & Beckett

[57] ABSTRACT

An apparatus for rotating a magnetic disc provided with a central hole and an entrainment opening comprises a hub member which is mounted on the shaft of an electric motor and which is provided with a flat surface on which the magnetic disc can be supported. The upper end of the shaft projects with play through the central hole in the disc. An entrainment peg which engages with the opening in the disc is fixed to one end of a movable arm which has the opposite end pivoted on the hub member. The entrainment peg is housed with play in a hole in the hub member and can move radially to center the disc with respect to the shaft of the motor, by virtue of a reaction force (F) imposed on the disc.

5 Claims, 4 Drawing Figures

4,672,486

APPARATUS FOR ROTATING A MAGNETIC DISC'

BACKGROUND OF THE INVENTION

1. Field of the Invention

The present invention relates to an apparatus for rotating a magnetic disc, for example a flexible disc which is contained within a protective casing or cassette of plastics material. The disc is of the type which has a central hole and an entrainment opening, which may be a slot.

The apparatus comprises a hub member provided with a flat surface on which the magnetic disc can be supported, and mounted on a shaft which is rotatable with respect to a fixed carrier. The shaft projects with respect to the flat surface of the hub member and can pass with play through the central hole in the disc. An entrainment peg is mounted on the hub member and projects from the flat surface thereof for the purposes of coupling to the entrainment opening in the disc.

2. Description of the Prior Art

An arrangement is known in which the entrainment peg is supported from oppositely disposed sides by two arms of a flexible plate in such a way as to permit the peg to tilt in a radial direction. In this arrangement, the entrainment peg is disposed at a predetermined and fixed distance D1 from the axis of rotation of the hub member. The distance D1 is less than the distance D2 between an outside edge of the entrainment opening and a reference edge of the central hole in the disc, so that, when the shaft fits through the central hole in the disc and the entrainment peg is coupled to the entrainment opening, the peg is forced into the opening and, by being tilted displaces the disc radially with respect to the shaft, positioning it with respect to the latter.

In the known arrangement however the entrainment peg is free also to tilt in a direction perpendicular to the radial direction, the plate member which carries it also being yielding in that direction.

That disadvantage causes incorrect angular positioning of the magnetic disc with respect to the shaft and since in the equipment which deals with this type of discs, the angular reference is normally made at the shaft, the above-indicated angular positioning error consequently gives rise to inaccurate positioning of the recording and reading heads in relation to the magnetised tracks on the disc.

SUMMARY OF THE INVENTION

The object of the present invention is to provide an apparatus in which the entrainment peg is capable of positioning the disc with respect to the rotary shaft accurately both axially and angularly.

To this end, the apparatus according to the invention provides in that the entrainment peg is fixed to one end of a movable arm having its other end pivoted on the hub member in such a way as to permit the peg to be displaced radially with respect to the shaft, while being maintained parallel to the axis of rotation thereof.

BRIEF DESCRIPTION OF THE DRAWING

The invention will be described in more detail, by way of example, and with reference to the accompanying drawings, in which.

DESCRIPTION OF THE PREFERRED EMBODIMENTS

Figure 1:
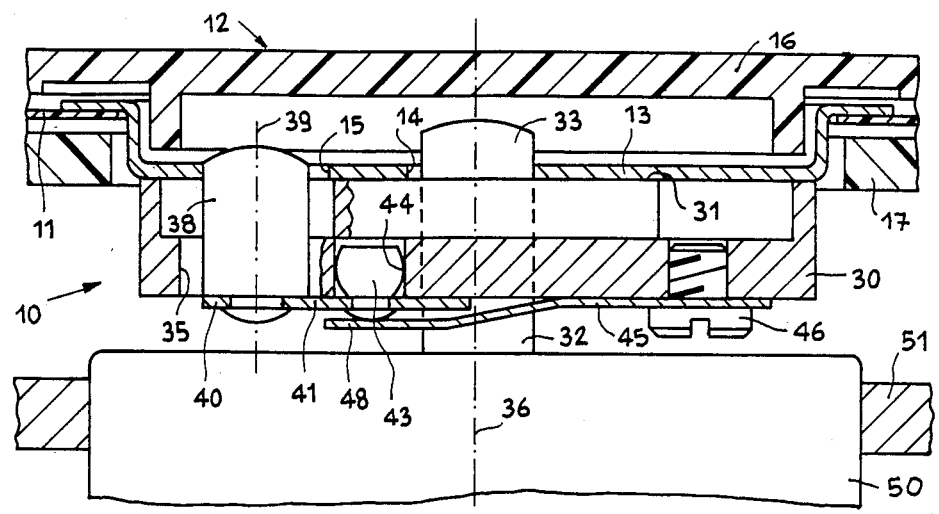
FIG. 1 is a partly sectional side view of an apparatus embodying the invention.
Figure 3:
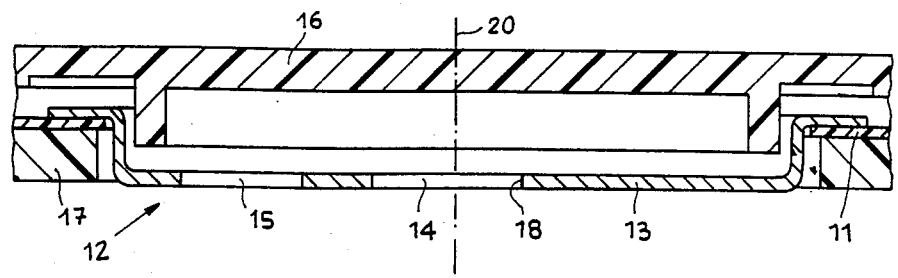
FIG. 3 is a partly sectional side view of a disc which can be handled by the apparatus according to the invention.
Figure 4:
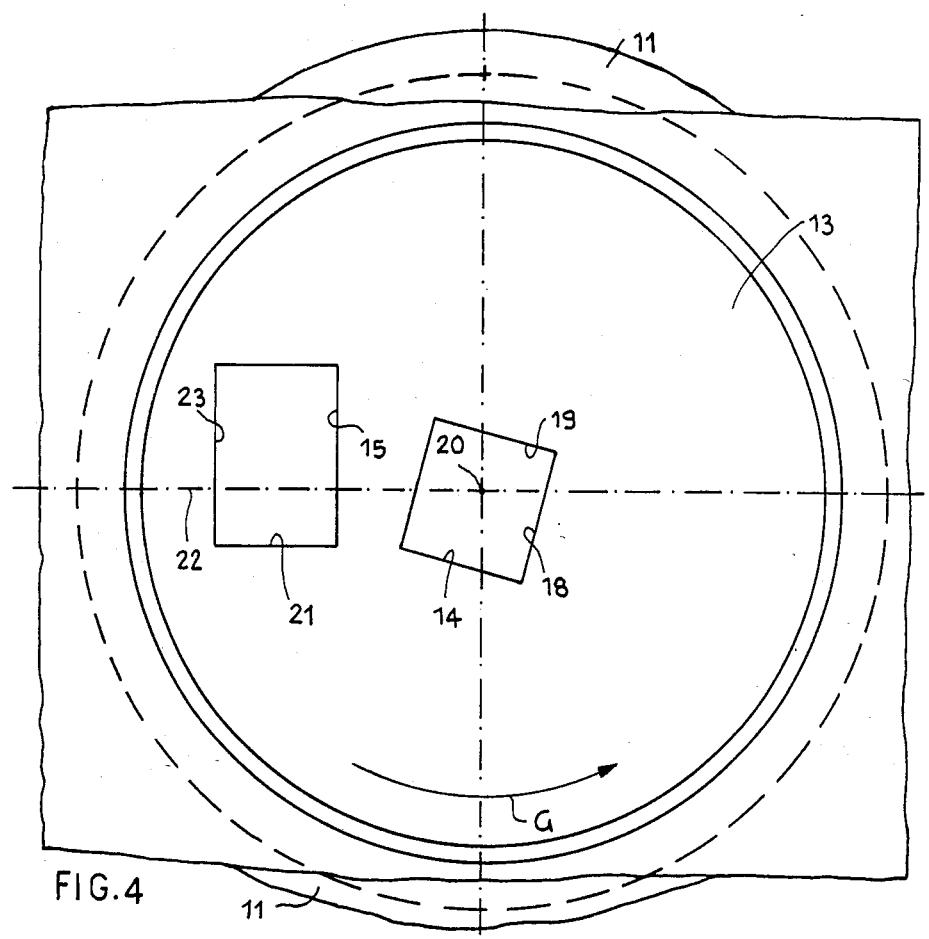
FIG. 4 is a view from below of part of the disc shown in FIG. 3.

Referring to FIG. 1, an apparatus 10 according to the invention is capable of rotating a magnetic disc 11 of known type, for example of the type which is known commercially as a 'microfloppy disc'. That type of disc is provided with a metallic central zone 13 (FIGS. 3 and 4) in which there are provided a central hole 14 and an entrainment opening or slot 15, and it is contained in an external protective case 12 formed by two half-shells shells 16 and 17 of plastics material. The central hole 14 is substantially square and comprises two inside edges 18 and 19 which are orthogonal relative to each other and equally spaced from the axis of rotation 20 of the disc.

The entrainment slot 15 is substantially rectangular with an inside edge 21 which is parallel to a diameter 22 of the disc 11 and an inside edge 23 which is perpendicular to the diameter 22.

The apparatus 10 (FIGS. 1 and 2) comprises a metal hub member 30 having a flat surface 31 on which the central part 13 of the magnetic disc 11 can be supported. The hub member 30 is mounted on a cylindrical shaft 32 which has an upper end 33 projecting with respect to the flat surface 31, and which can fit through the central hole 14 in the disc 11. The radius of the upper end 33 of the shaft 32 is equal to the spacing of the inside edges 18 and 19 of the hole 14 from the axis of rotation 20 of the disc 11.

The hub member 30 is provided with a cylindrical hole 35 which is disposed eccentrically with respect to the axis of rotation 36 of the central shaft 32. Housed within the hole 35, with ample clearance, is an entrainment peg 38 which has its axis 39 parallel to the axis of rotation 36 and which is capable of being coupled to the opening 15 in the magnetic disc 11.

The peg 38 is mounted at one end 40 of a metal arm 41 which has its opposite end 42 pivotally mounted on a pin 43 in the hub member 30. The pin 43 is fixed to the arm 41, is of a barrel shape and is housed in a hole 44 which is eccentric with respect to the central shaft 32.

A flat spring 45 which is similar in shape to a L is fixed to the hub member 30 by means of two screws 46 and 47 and has an arm 48 pressing on to the pin 43 to retain it in its housed position in the hole 44.

The shaft 32 can be driven in rotation by an electric motor 50, for example of the brushless type, which is mounted on a fixed carrier 51.

The mode of operation of the apparatus described hereinbefore is as follows:

The case 12 containing the magnetic disc 11 is positioned with respect to the spindle member 30 (see FIG. 1) in any known fashion, for example as described in our published European patent application No. EP 0 157 588. In particular, the central hole 14 in the magnetic disc 11 is coupled to the upper end 33 of the shaft 32.

Figure 2:
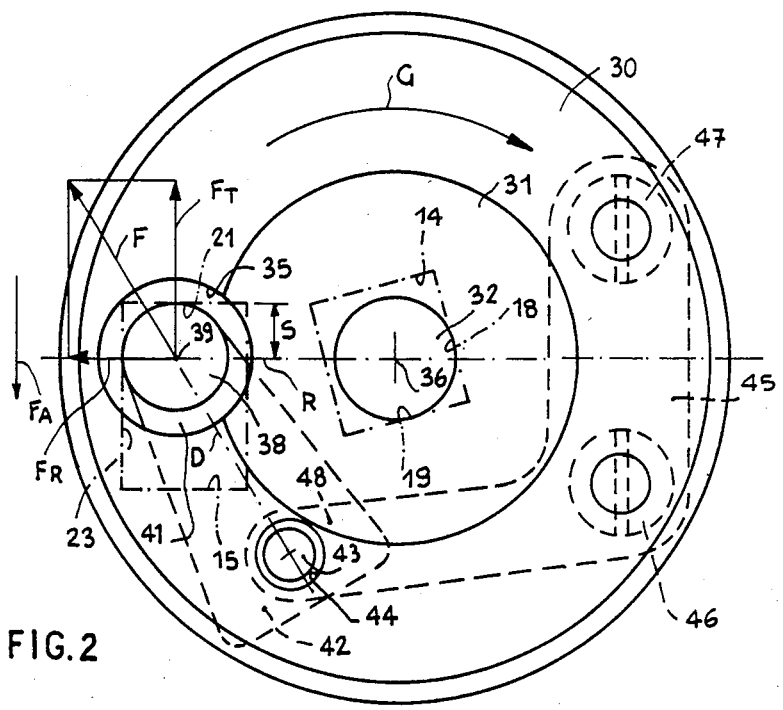
FIG. 2 is a plan view of the apparatus shown in FIG. 1.

The electric motor 50 is then powered and rotates the spindle member 30 in the direction indicated by the arrow G in FIG. 2. The entrainment peg 38 which is yielding in a downward direction (see FIG. 1) but which is constantly urged upwardly by the flat spring 45 will be coupled to the opening 15 in the disc 11, during the first revolution of the spindle member 30.

The arm 41 on which the peg 38 is mounted being free to rotate about the pivot 43 (FIG. 2), the peg 38 bears perfectly against the inside edges 21 and 22 of the opening 15 and transmits an entrainment force F to the disc 11, in a direction D, passing through the axis 39 of the peg 38 and the axis of the pin 43. The force F is resolved into a radial component $F_R$ and a tangential component $F_T$ which consequently provide for perfect contact between the inside edges 18 and 19 of the central hole 14 and the central shaft 32. That connection is also promoted by a tangential force $F_A$ due to friction between the disc 11 and its case 12 and the connection between the disc 11 itself and the recording and/or reading members (not shown in the drawings).

In that way, the central axis 20 of the disc is caused to coincide perfectly with the axis of rotation 36 of the shaft 32 and the hub member 30.

The arrangement also ensures perfect radial and angular positioning of the disc 11 with respect to the hub member 30 and the shaft 32. In fact, when the coupling between the peg 38 and the opening 15 is made, the inside edge 21 of the opening 15 will always be positioned at a predetermined distance S from a reference radius R passing through the centre of the peg 38.

Since the entrainment peg 38 is maintained with its axis 39 constantly parallel to the axis of rotation 36, the arm 41 being sufficiently rigid as not to flex, angular and axial positioning of the disc with respect to the shaft 32 is maintained throughout the rotary movement.

It will be clear therefore that, since the entrainment peg 38 is mounted at the end 40 of the movable arm 41 which has its other end 42 pivoted on the hub member 30 in such a way as to permit the peg 38 to move radially with respect to the central shaft 32, while remaining parallel to the axis of rotation 36 thereof, the connection between the peg 38 and the opening 15 in the disc 11 positions the disc 11 accurately both axially and angularly with respect to the shaft 32.

I claim:

1. An apparatus for rotating a magnetic disc provided with a central hole and an entrainment opening, comprising a hub member having a flat surface on which the magnetic disc can be supported, and mounted on a central shaft which has an end projecting with respect to the flat surface for fitting through the central hole in the disc, an entrainment peg mounted on the hub member for coupling to the entrainment opening, and a motor for rotating the shaft and hub member, wherein said the entrainment peg is mounted at one end of a movable arm having its other end pivoted on the hub member in such a way as to permit the peg to move radially with respect to the central shaft, while remaining parallel to the axis of rotation of the shaft.

2. Apparatus according to claim 1, wherein the entrainment opening comprises two substantially mutually perpendicular inside edges, and wherein the entrainment peg is capable of bearing against these two inside edges to transmit to the disc a force (F) which can be resolved into a radial component ($F_R$) and a tangential component ($F_T$).

3. Apparatus according to claim 2, wherein the radial and tangential components ($F_R$ and $F_T$) are substantially perpendicular to the inside edges of the entrainment opening.

4. Apparatus according to claim 2 wherein the central hole comprises two substantially mutually perpendicular inside edges, and wherein central shaft bears constantly against the inside edges of the central hole due to the effect of the force (F) applied by the entrainment peg to the entrainment opening.

5. Apparatus according to claim 1, wherein said movable arm is pivoted to the hub member by means of a pin which is housed in a hole in the hub member eccentric with respect to the axis of rotation, and the pin is maintained in its hole by a resilient element fixed to the hub member on the opposite side with respect to the said flat surface.

* * * * *